(12) United States Patent
Gupta et al.

(10) Patent No.: US 9,531,800 B2
(45) Date of Patent: Dec. 27, 2016

(54) THROTTLING GROUP IN ORACLE SERVICE BUS

(71) Applicant: Oracle International Corporation, Redwood Shores, CA (US)

(72) Inventors: Rahul Gupta, Sunnyvale (IN); Dimitri Laloue, Mountain View (FR); Kiran Prabhakar, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 356 days.

(21) Appl. No.: 13/801,972

(22) Filed: Mar. 13, 2013

(65) Prior Publication Data

US 2014/0280819 A1     Sep. 18, 2014

(51) Int. Cl.
*H04L 29/08*     (2006.01)
*G06F 9/50*      (2006.01)

(52) U.S. Cl.
CPC ......... *H04L 67/1031* (2013.01); *G06F 9/5083* (2013.01); *H04L 67/1008* (2013.01); *G06F 2209/504* (2013.01); *Y02B 60/142* (2013.01)

(58) Field of Classification Search
CPC ......... G06F 15/177; G06F 21/20; G06F 21/34
USPC ......................................................... 709/223
See application file for complete search history.

(56) References Cited

U.S. PATENT DOCUMENTS

2006/0233108 A1*  10/2006  Krishnan ..................... 370/235
2013/0018703 A1*   1/2013  Majeed et al. ............... 705/7.38

* cited by examiner

*Primary Examiner* — David Lazaro
*Assistant Examiner* — Zia Khurshid
(74) *Attorney, Agent, or Firm* — Marger Johnson

(57) ABSTRACT

A computer-controlled method can include creating a throttling group corresponding to a backend server configured to provide business services to multiple electronic devices over a service bus, defining a throttling group parameter for the throttling group, and routing messages based on the throttling group parameter.

23 Claims, 2 Drawing Sheets

THROTTLING GROUP IN ORACLE SERVICE BUS

BACKGROUND

A business service in Oracle service bus (OSB) generally invokes, e.g., sends a request to, multiple services hosted on a number of back-end servers. Such services can be hosted on a single server, and multiple business services may invoke services hosted on the same server. Currently, OSB customers may restrict the number of concurrent requests made to a particular server or group of servers by specifying a number of constraints that are applicable to a particular business service or a group of multiple business services. This is necessitated by the fact that the server (or servers) hosting the services usually have resource limits and, in order to provide an acceptable level of service, the server(s) should not be over-loaded, if possible.

These currently-used techniques have a number of significant limitations. For example, a constraint value generally needs to be specified for every business service that makes requests to a particular back-end server. Also, these constraint values typically need to be manually computed based on the total desired server constraint, which further leads to the issue of fair distribution of capacity between business services invoking the same back-end server. In addition, a given business service generally cannot have more than the specified constraint requests even if other business services invoking the same server are under a light load, thus resulting in an under-utilization of server resources. Further, there are maintainability issues that must be taken into account. For example, the constraint values for every business service typically need to be re-computed and modified whenever the load-bearing capacity of the back-end server(s) changes.

Accordingly, there remains a need for a way to address these and other deficiencies associated with the prior art.

DETAILED DESCRIPTION

Figure 1:
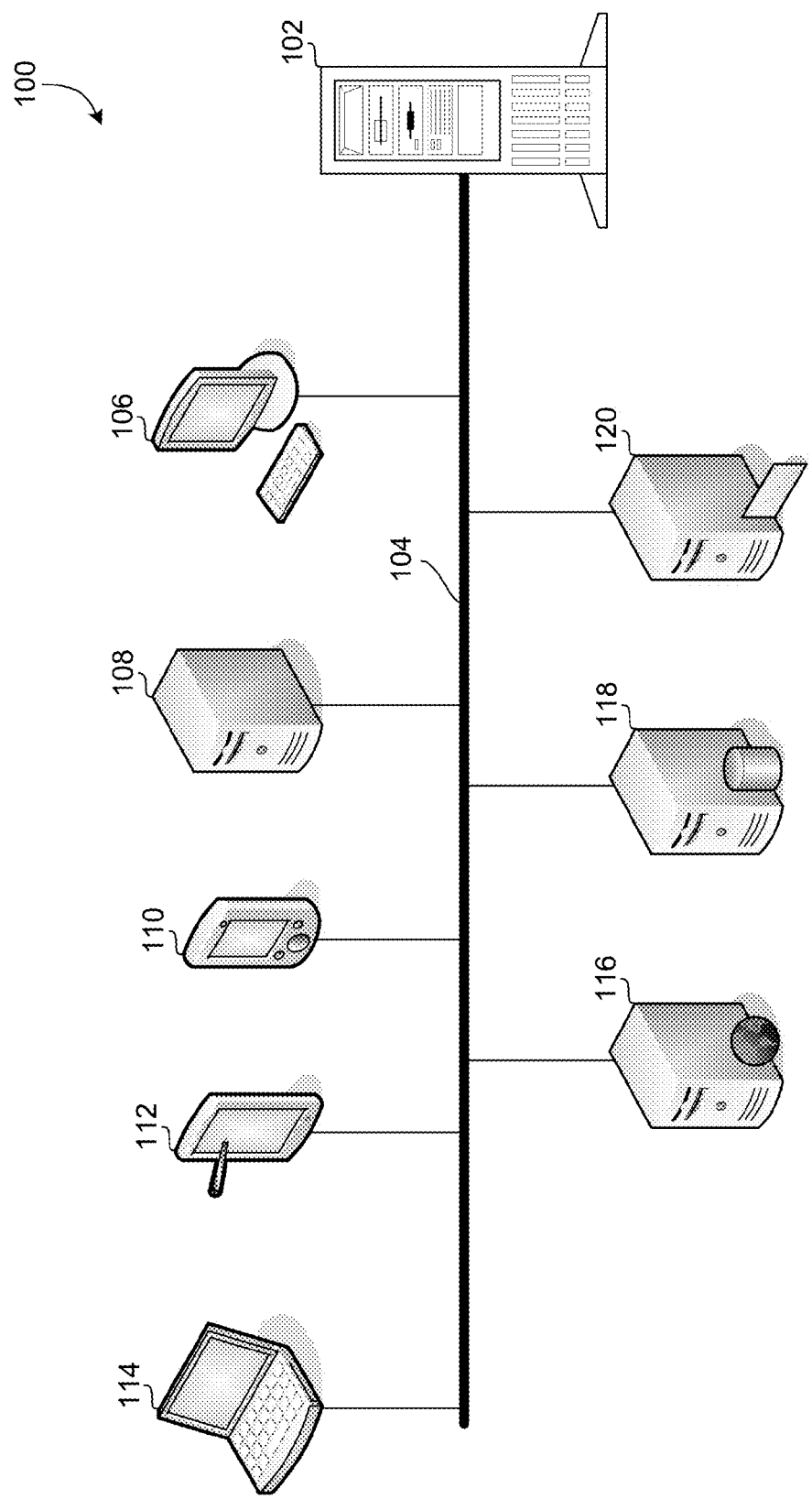
FIG. 1 illustrates an example of a system in accordance with certain implementations of the disclosed technology.

FIG. 1 illustrates an example of a system 100 in accordance with certain implementations of the disclosed technology. In the example, the system 100 includes a backend server 102 configured to provide business services via an Oracle service bus (OSB) 104 to any of a number of a potentially wide variety of devices 106-120. While the illustrated example includes a single server 102, it will be appreciated that the disclosed technology is also suitable for systems having multiple backend servers.

As used herein, the interchangeable terms throttling settings and throttling options generally refer to sets of options that define how messages sent to a business service are to be controlled. The term throttling group generally refers to a set of options that define how messages sent to a remote server are to be controlled. The term may also be used to refer to a set of URLs associated with an Oracle service bus (OSB) throttling group resource, and is representative of a given back-end system hosting services references by OSB business services. As used herein, the term throttling capacity—or simply capacity—generally refers to a maximum allowable concurrency for a corresponding throttling group.

Whereas current throttling techniques may enable users to specify limits for a business service without regards to the backend server hosting the referenced services, certain implementations of the disclosed technology may advantageously enable a user to model a backend server and further enable global capacity limits such that the number of requests being sent to the backend system does not exceed the specifications for the system.

Further, whereas current throttling techniques are limited to a one-to-one relation between a set of throttling settings and a given business service, e.g., settings cannot be shared between services, certain implementations of the disclosed technology may advantageously enable users to define a throttling group that can be shared across multiple business services and restrict the flow of messages going to a particular remote server independent of the business service sending such messages.

Certain embodiments of the disclosed technology are generally directed to a throttling group that models a back-end server hosting a set of business services and enables a user to enforce global capacity constraints so that the number of concurrent requests being sent to the back-end server does not exceed certain parameters such as system specifications, for example. Certain implementation of such throttling groups may be applicable to all products in the integration and Enterprise Service Bus domain.

The ability to model a back-end server with a specified capacity constraint using a throttling group generally provides the ability to overcome the various shortcomings of current techniques as noted above. For example, because certain implementations of the disclosed technology generally require that only a single constraint value be specified for a given back-end server, there is no need to compute separate values for every business service. Also, certain implementations may provide that, at any given time, any business service associated with the same server can send requests so long as total number of requests sent to the server meet the specified constraint. Further, maintenance may be simplified because, when a given server load-bearing capacity changes, only one constraint value may need to be modified.

Throttling groups in accordance with the disclosed technology may also provide a number of additional advantages over current solutions. For example, users may model a given back-end server as a throttling group and specify a capacity constraint therefor. Also, users may toggle, e.g., turn on/off, enforcement of the capacity constraints for a given server based on the corresponding throttling group. In certain embodiments, this functionality may be combined with the specifying of constraints for business services and can thus be used for fine-grain tuning of the corresponding system.

In certain embodiments, a throttling group is a resource in the OSB runtime that defines the throttling restrictions applicable to a remote server. This may include parameters that can optionally be configured by an integration operator and shared across business services. There are generally two classes of parameters within a throttling group: parameters that determine the throttling constraints for the throttling group, and parameters that provide default values for the corresponding throttling settings in the associated business services.

Parameters that determine the throttling constraints for a throttling group generally include throttling state, i.e., a flag that determines whether or not messages routed to the throttling group are to be subjected to the group concurrency settings, and group maximum concurrency, i.e., a message concurrency limit. If the throttling state is set to disabled, the throttling group would generally behave as if having an infinite capacity. The group maximum concurrency generally allows restricting the amount of messages being processed simultaneously by the throttling group and is generally only settable when the throttling state is set to enable. If left empty, the business service capacity will be infinite and message processing will generally be restricted only by the limits imposed by the associated throttling group(s).

Parameters that provide default values for corresponding throttling settings in the associated business services generally include throttling queue length, i.e., the queue length to be used for the associated business service in the case none is specified on its operational settings, and time to live (TTL), e.g., the TTL to be used for the associated business service in case none is specified on its operational settings. Both of these parameters are typically to be used at runtime only and generally have no effect on the business service definition. If either parameter is left empty, the business service, at runtime, will generally inherit the value specified in the associated throttling groups and, if the business service is associated with multiple groups, the maximum of all the groups will be inherited. In the event that none of the associated groups have the throttling queue length value set, the queue length will be 0, i.e., there will be no queue. In the event that none of the associated groups have the TTL value set, the TTL will be infinite, i.e., there will be no expiration.

In certain implementations of the disclosed technology, a user, e.g., operator, may associate the URL(s) for a business service with one or more throttling groups. One result of such association may be a resource dependency from the business service to the throttling group. In certain embodiments, a single URL may be associated with no more than a single throttling group. In certain embodiments, a user may perform this association on the Operational Settings page for the Business Service only when throttling on the service is enabled or, alternatively, via a tooling page that allows users to quickly enable throttling on one or more business services.

In certain embodiments, a throttling engine may determine whether or not to route a message to a certain URL based on the auto-assigned URL capacity, e.g., the capacity automatically assigned to the URL based on the business service capacity, or the throttling group associated with the URL (if any). In case the URL is not at capacity, the load of the associated throttling group may be checked. If the load is less than the capacity for the group, the message may be routed to the URL and the load at the group level and the URL level incremented; otherwise, if the load is equal—or greater—than the group capacity, the next URL in the business service may be tried.

Various parameters may be modified for a given throttling group. For example, a group maximum concurrency may be increased, thus resulting in messages waiting in business service queues to be processed (so long as the business capacity has not been reached), or decreased, thus resulting in a temporary overload of the system. In such cases, however, normal processing may resume once the load becomes less than the new capacity. Other parameters that may be modified include queue length, which might result in a change to the queue length of the associated business services, and TTL, which might result in a change to the TTL of the associated business services.

In certain embodiments, a throttling group may be deleted. In such situations, any messages that are currently being processed may be processed completely and any URLs associated with the group will generally no longer have a group associated therewith. In the event that some messages were queued up because the throttling group was at full capacity while the URL was not at full capacity, such messages may be selected for processing.

In certain embodiments, a throttling group may be renamed. When renaming a throttling group, the throttling engine will generally allocate new throttling resources for the group. Any messages that are currently being processed by the throttling group may no longer count toward the overall load. This may result in a temporary overload of the backend system until the currently-processed messages return. Generally, however, no messages will be dropped as a result of this modification alone.

Certain implementations of the disclosed technology are directed to clustering behavior. In such embodiments, the throttling capacity may be a cluster-wide setting where each managed server has its own server-specific capacity. The group throttling capacity may be equally split among all managed servers regardless of whether they are running. The server-specific throttling capacity may be rounded to the upper integer such that, if a cluster has 3 managed servers and the capacity is 10 for example, the server-specific capacity distribution would be 4, 4, and 4. The minimum capacity is generally 1.

Clustering-related computations may generally be performed when a managed server starts. Any running managed server typically does not re-compute these values when a new node is added or an existing node goes down, thus resulting in an increment or reduction, respectively, in the effective capacity of the overall system. If a cluster has 2 managed servers and the capacity is 10, for example, then the server-specific capacity distribution would be 5 and 5. In the event a new node is added, the new distribution would be 5, 5, and 4 (assuming the previous two nodes did not require a restart). In the case of restarting the system, the distribution would be 4, 4, and 4.

Business services will generally have equal priority from the perspective of a given throttling group, and capacity requests will typically be honored based on message priorities followed by message timestamps. In situations where multiple business services are waiting for capacity at a group and capacity becomes available, the messages at the head of each business service queue will generally be checked and the message having the highest priority will typically be selected for processing. In the event that all messages at the heads have the same priority, the message that arrived earliest will be typically be selected, thus effectively resulting in a first-in-first-out (FIFO) policy. Message priority will generally be honored within a business service as well as when selecting which business service is to get the available capacity for a group.

Figure 2:
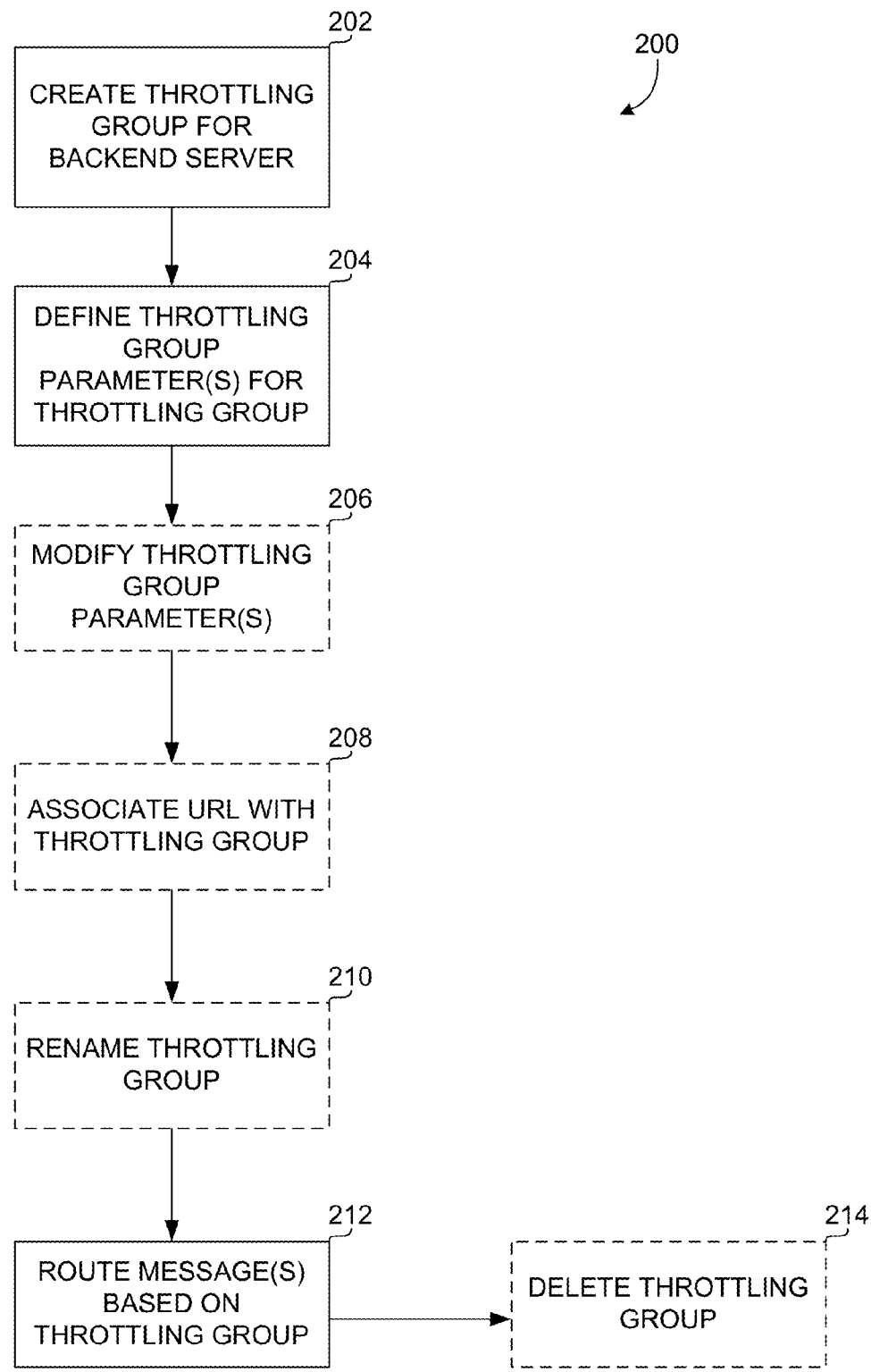
FIG. 2 illustrates an example of a computer-controlled method in accordance with certain implementations of the disclosed technology.

FIG. 2 illustrates an example of a computer-controlled method 200 in accordance with certain implementations of the disclosed technology. At 202, a throttling group corresponding to a backend server providing business services over an Oracle service bus (OSB) is created. At 204, at least one throttling group parameter is defined for the throttling group. The throttling group parameter(s) may be optionally modified, as indicated at 206. Alternatively or in addition thereto, a URL may optionally be associated with the throttling group, as indicated at 208. Alternatively or in addition thereto, the throttling group may be optionally renamed, as indicated at 210. At 212, one or more messages are routed based at least in part on the throttling group. The throttling group may be optionally deleted, as indicated at 214.

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines may include computing devices such as personal computers, workstations, servers, portable computers, handheld devices, tablet devices, and the like.

Typically, a machine includes a system bus to which processors, memory such as random access memory (RAM), read-only memory (ROM), and other state-preserving medium, storage devices, a video interface, and input/output interface ports can be attached. The machine may also include embedded controllers such as programmable or non-programmable logic devices or arrays, Application Specific Integrated Circuits (ASICs), embedded computers, smart cards, and the like. The machine may be controlled, at least in part, by input from conventional input devices such as keyboards and mice, as well as by directives received from another machine, interaction with a virtual reality (VR) environment, biometric feedback, or other pertinent input.

The machine may utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology may be described by reference to or in conjunction with associated data including functions, procedures, data structures, application programs, instructions, etc. that, when accessed by a machine, may result in the machine performing tasks or defining abstract data types or low-level hardware contexts. Associated data may be stored in, for example, volatile and/or non-volatile memory, such as RAM and ROM, or in other storage devices and their associated storage media, which can include hard-drives, floppy-disks, optical storage, tapes, flash memory, memory sticks, digital video disks, biological storage, and other non-transitory, physical storage media.

Associated data may be delivered over transmission environments, including the physical and/or logical network, in the form of packets, serial data, parallel data, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

We claim:

1. A computer-controlled method, comprising:
    a processor creating a first throttling group corresponding to a first backend server that is configured to provide business services to a first plurality of electronic devices over a service bus, the first throttling group including a set of options that define how messages sent to the first backend server are to be controlled;
    the processor defining at least one throttling group parameter for the first throttling group the at least one throttling group parameter for the first throttling group including a first throttling state, at least one first group concurrency setting, or both the first throttling state and the at least one first group concurrency setting, the first throttling state including a first flag to determine whether messages routed to the first throttling group are to be subjected to the at least one first group concurrency setting, and the at least one first group concurrency setting including a first group maximum concurrency to restrict a certain number of messages being processed simultaneously by the first throttling group; and
    the processor routing at least one message based at least in part on the first throttling group.

2. The computer-controlled method of claim 1, wherein the first backend server is a remote server.

3. The computer-controlled method of claim 1, wherein the service bus is an Oracle service bus (OSB).

4. The computer-controlled method of claim 1, wherein the at least one throttling group parameter for the first throttling group further includes a throttling queue length, a time to live (TTL), or both the throttling queue length and the TTL.

5. The computer-controlled method of claim 4, further comprising the processor providing a default value for the throttling queue length.

6. The computer-controlled method of claim 4, further comprising the processor providing a default value for the TTL.

7. The computer-controlled method of claim 1, further comprising the processor modifying the at least one throttling group parameter.

8. The computer-controlled method of claim 1, further comprising:
    the processor creating a second throttling group corresponding to a second backend server configured to provide business services to a second plurality of electronic devices over the service bus, the second throttling group including a set of options that define how messages sent to the second backend server are to be controlled; and
    the processor defining at least one throttling group parameter for the second throttling group, the at least one throttling group parameter for the second throttling group including a second throttling state, at least one second group concurrency setting, or both the second throttling state and the at least one second group concurrency setting, the second throttling state including a second flag to determine whether messages routed to the second throttling group are to be subjected to the at least one second group concurrency setting, and the at least one second group concurrency setting including a second group maximum concurrency to restrict a certain number of messages being processed simultaneously by the second throttling group.

9. The computer-controlled method of claim 8, wherein the first and second backend servers are remote servers.

10. The computer-controlled method of claim 8, further comprising the processor routing at least one message based at least in part on either or both of the first throttling group and the second throttling group.

11. The computer-controlled method of claim 8, further comprising the processor associating a first uniform resource locator (URL) to the first throttling group and a second URL to the second throttling group.

12. The computer-controlled method of claim 8, further comprising the processor deleting either or both of the first and second throttling groups.

13. The computer-controlled method of claim 8, further comprising the processor renaming either or both of the first and second throttling groups.

14. The computer-controlled method of claim 1, further comprising the processor associating a uniform resource locator (URL) to the first throttling group.

15. The computer-controlled method of claim 1, further comprising the processor deleting the first throttling group.

16. The computer-controlled method of claim 15, wherein any messages that are being processed are processed completely and any URLs associated with the first throttling group will no longer be associated with the first throttling group.

17. The computer-controlled method of claim 1, further comprising the processor renaming the first throttling group.

18. The computer-controlled method of claim 17, further comprising the processor allocating new throttling resources for the first throttling group.

19. One or more non-transitory computer-readable media storing executable instructions that, when executed by a processor, cause the processor to perform the computer-controlled method of claim 1.

20. The computer-controlled method of claim 1, further comprising the processor increasing the first group maximum concurrency to allow for one or more messages that are waiting in a business server queue to be processed.

21. A system, comprising:
a memory; and
a processor configured to:
create a throttling group corresponding to a backend server configured to provide business services to a plurality of electronic devices over a service bus, the throttling group including a set of options that define how messages sent to the backend server are to be controlled;
define at least one throttling group parameter for the throttling group, the at least one throttling group parameter for the throttling group including a throttling state, at least one group concurrency setting, or both the throttling state and the at least one group concurrency setting, the throttling state including a flag to determine whether messages routed to the throttling group are to be subjected to the at least one group concurrency setting, and the at least one group concurrency setting including a group maximum concurrency to restrict a certain number of messages being processed simultaneously by the throttling group; and
route at least one message based at least in part on the throttling group.

22. The system of claim 21, further comprising a memory configured to store the throttling group.

23. The system of claim 21, further comprising a uniform resource locator (URL) associated with the throttling group.

* * * * *

UNITED STATES PATENT AND TRADEMARK OFFICE
CERTIFICATE OF CORRECTION

| | |
|---|---|
| PATENT NO. | : 9,531,800 B2 |
| APPLICATION NO. | : 13/801972 |
| DATED | : December 27, 2016 |
| INVENTOR(S) | : Gupta et al. |

It is certified that error appears in the above-identified patent and that said Letters Patent is hereby corrected as shown below:

In the Claims

In Column 6, Line 20, in Claim 1, delete "group the" and insert -- group, the --, therefor.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*